SUPERCONDUCTIVE SWITCH COMPRISING CARBON

Filed Jan. 2, 1964

United States Patent Office 3,255,335

Patented June 7, 1966

3,255,335

SUPERCONDUCTIVE SWITCH COMPRISING CARBON

Ronald Kortelink, Burlington, Mass., assignor to Ion Physics Corporation, Burlington, Mass., a corporation of Delaware Filed Jan. 2, 1964, Ser. No. 335,136
1 Claim. (Cl. 200—166)

This invention relates to superconductive devices and more particularly to a new and improved superconductive switch of the so-called persistent current type.

It is a principal object of this invention to provide a simplified and improved persistent current switch for use in superconducting circuits.

It is another object of this invention to provide a switch of the type described that is easier to fabricate than comparable prior art devices.

It is still another object of this invention to provide a persistent current switch that is more economical to produce than comparable prior art switches.

These, together with other objects and features of the invention will become more readily apparent from the following detailed description thereof taken in conjunction with the accompanying drawings wherein like elements are given like reference numerals throughout and in which.

Figure 1:
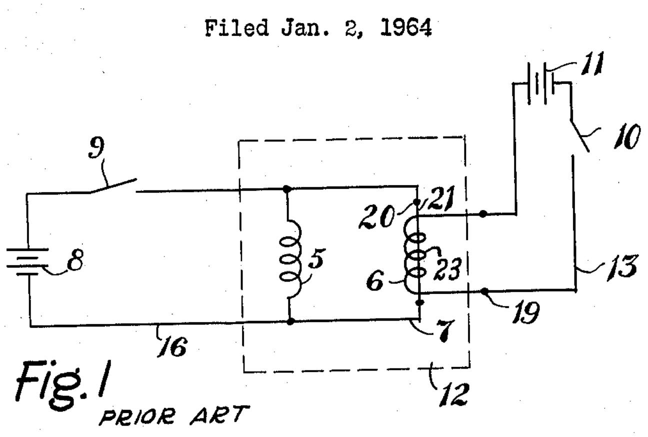
Fig. 1 PRIOR ART
FIGURE 1 is a schematic diagram illustrating one application of a switch of the type comprehended by this invention.

Referring now to the schematic diagram of FIGURE 1, there is illustrated thereby a superconductive circuit adapted to store electrical energy. In operation, superconductive coil 5 and superconductive conductor 7 form a closed electrical circuit within which an electrical current is made to continuously circulate. This can be accomplished because of the unique properties of superconductive material, which, when maintained in a cryogenic temperature such as that provided by liquid helium environment 12, present no measurable resistance to an electrical current flowing therein.

An electrical current is established in the superconducting circuit in the following manner. Superconductive persistent current switch 6 is physically inserted into the superconducting circuit as shown. A prior art persistent current switch such as is illustrated in FIGURE 1 comprises a length of superconductive conductor 21 around which is wound heater element 23 which consists of many turns of fine copper wire. It is necessary, with such a switch, to insert conductor 21 into the circuit by breaking conductor 7 and making electrical connections 20. It is also necessary to make electrical connections 19 whereby heater element 23 is connected to a heater supply circuit comprising conductor 13, switch 10, and battery 11. Switch 10 is closed and heater element 23 causes superconductive conductor 21 to become non-superconducting and therefore resistive. Switch 9 is closed causing a current to flow in the circuit comprising battery 8, conductor 16 and superconductive coil 5. Since coil 5 is in a superconducting state (and therefore offers no resistance to current flowing therethrough) and conductor 21 is not, substantially all of the current flows through the coil. Switches 9 and 10 are then both opened; switch 10 being opened first to permit conductor 21 to become superconducting and switch 9 being opened thereafter to disconnect battery 8. As a result of conductor 12 becoming superconducting and non-resistive, the current flowing in coil 5 flows through the non-resistive superconducting circuit comprising coil 5, conductor 7 and conductor 21 without further need of battery 8.

Considering now, in some detail, the prior art persistent current switch represented by switch 6 of FIGURE 1, it is pointed out that various disadvantages associated therewith render its use awkward and its cost prohibitive. For example, with such a switch it is necessary to insert the superconductive conductor element 21 into the circuit to be switched. This means that a difficult connection must be made within the cryogenic environment and that once made the installation is permanent. Also, another difficult connection must be made between heater element 23 and the heater power supply. The terminals of heater element 23, which are simply extensions of the fine coiled copper heater wire, have about the same gauge as human hair and therefore effecting a good electrical connection creates a problem.

The heater element of such a switch has in the past been fabricated of this extremely fine copper wire because at cryogenic temperatures the resistance of all metals is greatly reduced. In the case of copper, which for production purposes has been considered most practical, it has been necessary to use approximately 1000 feet of No. 37 wire to obtain 5 ohms of resistance at liquid helium temperature (4.2° K.). In the switching operation of the apparatus described above with respect to FIGURE 1 a current of about one ampere passing through such a heater element would normally be sufficient to put the superconductive conduit in a non-superconducting state.

It is apparent that the fabrication of a switch having a thousand feet of wound filamentary copper wire is a difficult operation at best. The poor mechanical strength of copper wire of No. 37 gauge and smaller results in frequent breakages and rewinding procedures which greatly add to production costs. Furthermore, the reliability of a device so fabricated is concomitantly poor.

Figure 2:
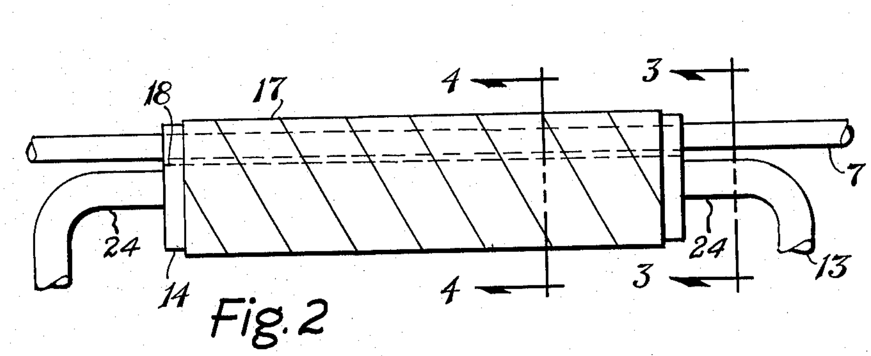
FIGURE 2 illustrates a superconductive persistent current switch fabricated in accordance with the principles of this invention.
Figure 3:
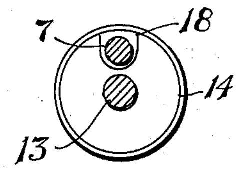
FIGURE 3 is a sectional view of FIGURE 2 taken at 3—3.
Figure 4:
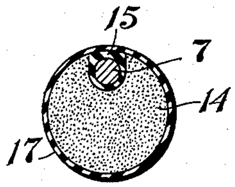
FIGURE 4 is a sectional view of FIGURE 2 taken at 4—4.

The present invention, as illustrated by FIGURES 2, 3 and 4 provides a superconductive persistent current switch which obviates all of the above problems. Such a switch comprises a slug of carbon material 14 having a groove 18 along one surface thereof and wire terminals 24. It has been recognized that the resistance of carbon increases at lower temperatures. Advantage has been taken of this unique property of carbon in the present invention to provide a simple effective heating element for a superconductive switch. The terminals 24 may be made of any convenient wire size thus permitting easy connection to the heater supply circuit. Of even greater significance is the ease of manufacture of such a device. It is possible even to utilize a conventional carbon resistor of appropriate size by simply cutting a proper groove therein. A further advantage of the invention is that it may be readily applied to any superconductive conductor by attachment. Filet material 15 may be used to fill the groove and a suitable tape 17 would be sufficient to maintain the switch in place during operation. Such a switch can be applied and removed at will and therefore has greater flexibility than prior art devices which must be permanently installed. Furthermore due to its simple construction the switch has a high degree of reliability.

While it has been shown and described what is considered at present to be a preferred embodiment of the invention, modifications thereto will readily occur to those skilled in the art. For example, the resistive slugs of the present invention may be fabricated of various semiconductive materials which exhibit suitable resistance values at cryogenic temperatures. It is not therefore desired that the invention be limited to the specific arrangement shown and described, and it is intended to cover in the appended claim all such modifications that fall within the true spirit and scope of the invention.

What is claimed is:

The combination of a superconductive circuit comprising a superconductive conductor, a slug of carbon material having a groove therein, said superconductive conductor disposed in said groove, means for passing an electric current through said slug, and means for controlling said electric current, whereby the temperature of said superconductive conductor may be varied so as to render said superconductive conductor superconducting or non-superconducting at will.

References Cited by the Examiner

UNITED STATES PATENTS

| | | | |
|---|---|---|---|
| 870,577 | 11/1907 | Naumer | 219—300 |
| 1,306,948 | 6/1919 | Clawson | 219—427 |
| 2,736,830 | 2/1956 | Savage | 200—166 X |
| 3,048,707 | 8/1962 | Nyberg | 338—32 X |
| 3,098,967 | 7/1963 | Keck | 338—32 X |
| 3,150,291 | 9/1964 | Laquer | 317—158 X |

ROBERT S. MACON, *Acting Primary Examiner.*

BERNARD A. GILHEANY, KATHLEEN H. CLAFFY, *Examiners.*

H. O. JONES, *Assistant Examiner.*